US006557840B2

(12) United States Patent
Sawdon

(10) Patent No.: US 6,557,840 B2
(45) Date of Patent: May 6, 2003

(54) POWERED CLAMP WITH UNLOCKING FEATURE

(75) Inventor: Edwin G. Sawdon, St. Clair, MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 09/881,553

(22) Filed: Jun. 14, 2001

(65) Prior Publication Data

US 2002/0190455 A1 Dec. 19, 2002

(51) Int. Cl.[7] .................................................. B23Q 3/08
(52) U.S. Cl. ............................ 269/32; 269/228; 269/27
(58) Field of Search ............................ 269/32, 228, 27, 269/233, 93, 94, 239, 24, 285

(56) References Cited

U.S. PATENT DOCUMENTS 4,905,973 A * 3/1990 Blatt ........................... 269/32
5,884,903 A * 3/1999 Sawdon ........................ 269/32
6,338,476 B1 * 1/2002 Takahashi ..................... 269/32
6,435,494 B2 * 8/2002 Takahashi et al. ............ 269/32
2001/0050455 A1 * 12/2001 Takahashi .................... 269/32

* cited by examiner

*Primary Examiner*—Lee Wilson
(74) *Attorney, Agent, or Firm*—Harness, Dickey & Pierce, P.L.C.

(57) ABSTRACT

A workpiece securing apparatus or clamp includes a piston, a coupling or transmission mechanism, and an unlock device. In another aspect of the present invention, the unlock device is rotatable to move the coupling mechanism. Still another aspect of the present invention provides a mechanism which converts linear movement of a piston to rotary motion of a hub and workpiece interfacing arm.

39 Claims, 8 Drawing Sheets

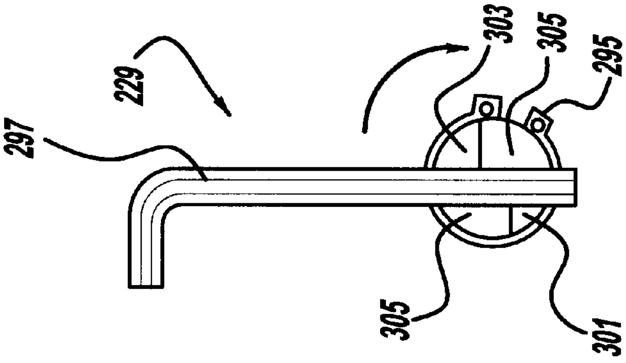
Figure - 9
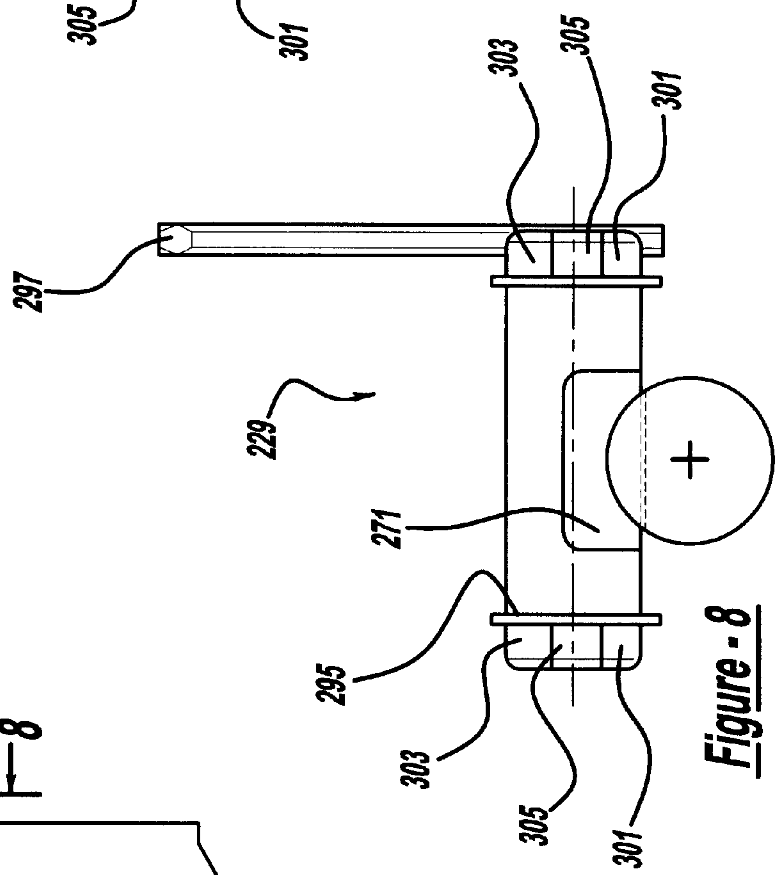
Figure - 8
Figure - 7
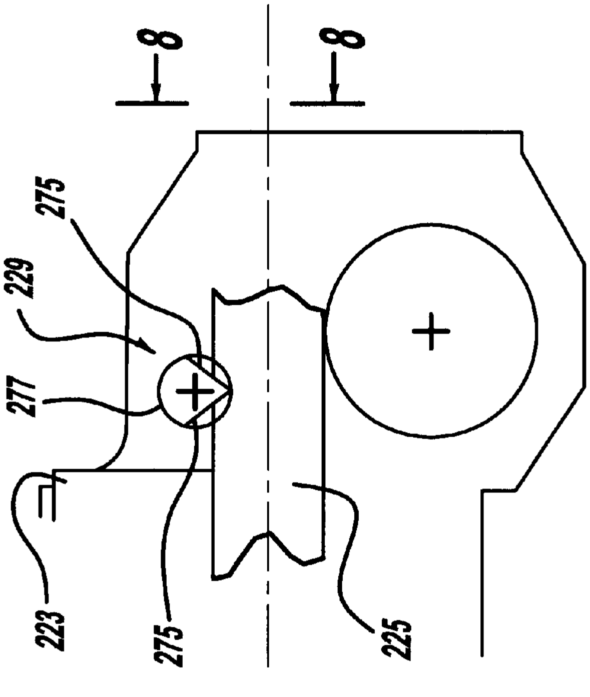

POWERED CLAMP WITH UNLOCKING FEATURE

BACKGROUND AND SUMMARY OF THE INVENTION

The present invention relates generally to workpiece securing apparatuses and more specifically to a powered clamp with an unlocking feature.

Pneumatically powered clamps have been used to secure workpieces, such as sheet metal panels for automotive vehicles, during welding, gauging or other industrial manufacturing operations. One such device is disclosed in U.S. Pat. No. 5,884,903 entitled "Powered Clamp and Gauging Apparatus" which issued to the present inventor on Mar. 23, 1999. This patent is incorporated by reference herein.

On occasion, there is a need to manually assist retracting movement of the piston rod, slide, link, hub and arm. One conventional resetting device is shown in U.S. Pat. No. 5,845,897 entitled "Toggle Lever Clamp Device for Automobile Body Fabrication" which issued to Tunkers on Dec. 8, 1998. In another clamp, a non-rotating, linearly moving and unthreaded, spool-type reset button has been employed to manually retract a slide and to serve as a supplemental stop. These resetting devices, however, project from an end of the clamp and are prone to undesired contact with passing workpieces or other machinery. Furthermore, these traditional, linearly moving resetting devices also serve as stops for the slide. Notwithstanding, manufacturing plant contamination settling on the greased spool or threads may inadvertently alter the stop location relative to the clamp housing after continuous use.

In accordance with the present invention, a workpiece securing apparatus or clamp includes a piston, a coupling or transmission mechanism, and an unlock device. In another aspect of the present invention, the unlock device is rotatable to move the coupling mechanism. Still another aspect of the present invention provides a mechanism which converts linear movement of a piston to rotary motion of a hub and workpiece interfacing arm. In yet another aspect of the present invention, a rotational axis of the unlock device is generally parallel to a rotational axis of the arm The clamp securing apparatus of the present invention is advantageous over traditional devices in that the present invention does not elongate the overall length of the apparatus. Furthermore, the unlock device does not project outside of the nominal width of the apparatus for one form of the invention. Moreover, the unlock device of the present invention is more reliably sealed to the adjacent housing as compared to conventional devices, thereby minimizing containment intrusion. Additionally, the tolerances and positioning of the unlock device do not impact the stopping location of the mechanism and arm, in another form of the invention. Additional advantages and features of the present invention will become apparent from the following description and appended claims, taken in conjunction with the accompanying drawings.

BRIEF DESCRIPTION OF THE DRAWINGS

FIG. 7 is a diagrammatic side view showing a second preferred embodiment clamp of the present invention;

FIG. 8 is an elevational view, taken in the direction of arrows 8—8 in FIG. 7, showing the unlock device employed in the second preferred embodiment clamp;

FIG. 9 is a side elevational view showing the unlock device employed in the second preferred embodiment clamp;

DETAILED DESCRIPTION OF THE PREFERRED EMBODIMENTS

Figure 1:
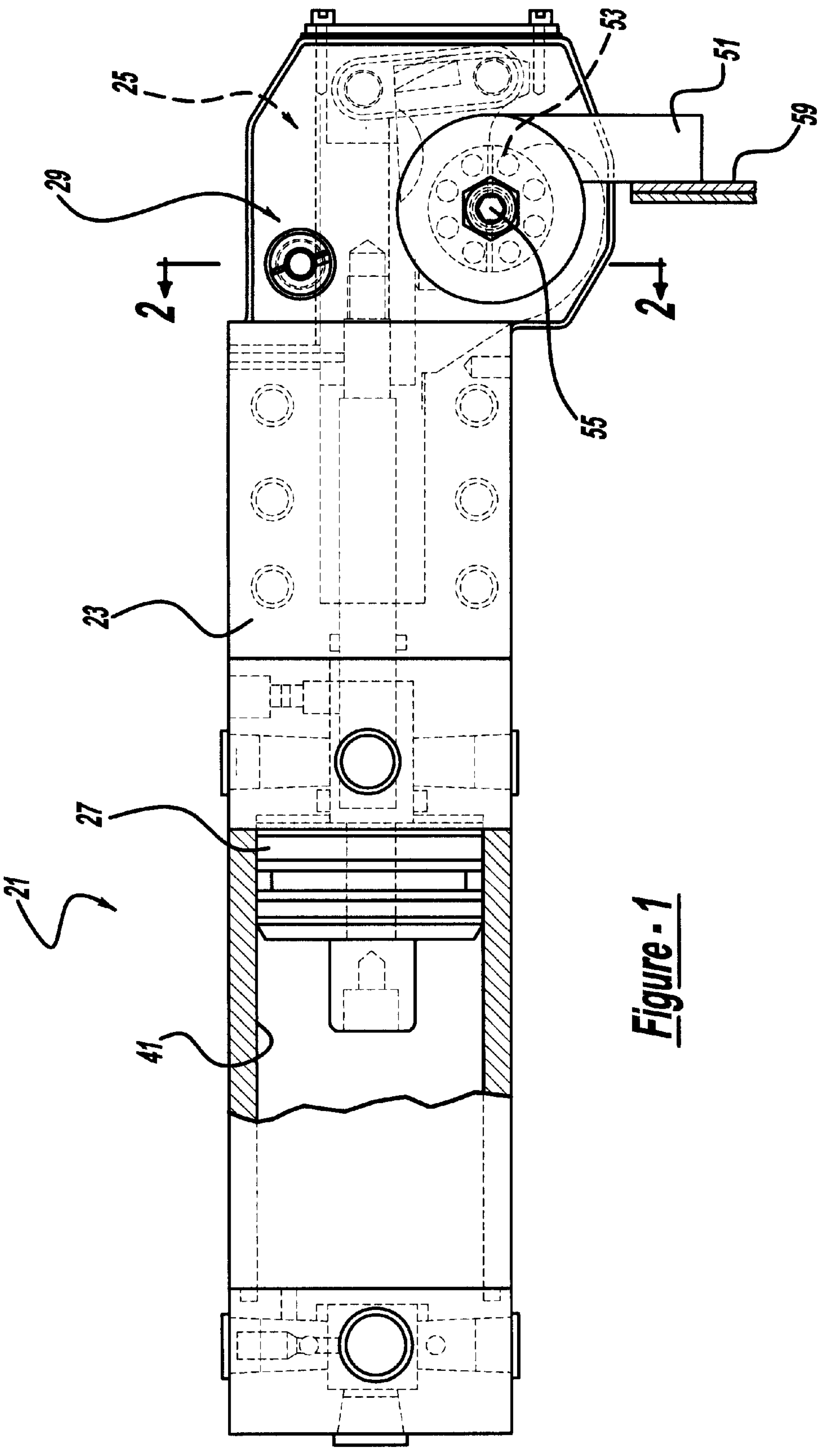
FIG. 1 is a partially fragmented, side elevational view showing a first preferred embodiment of a clamp of the present invention.
Figure 2:
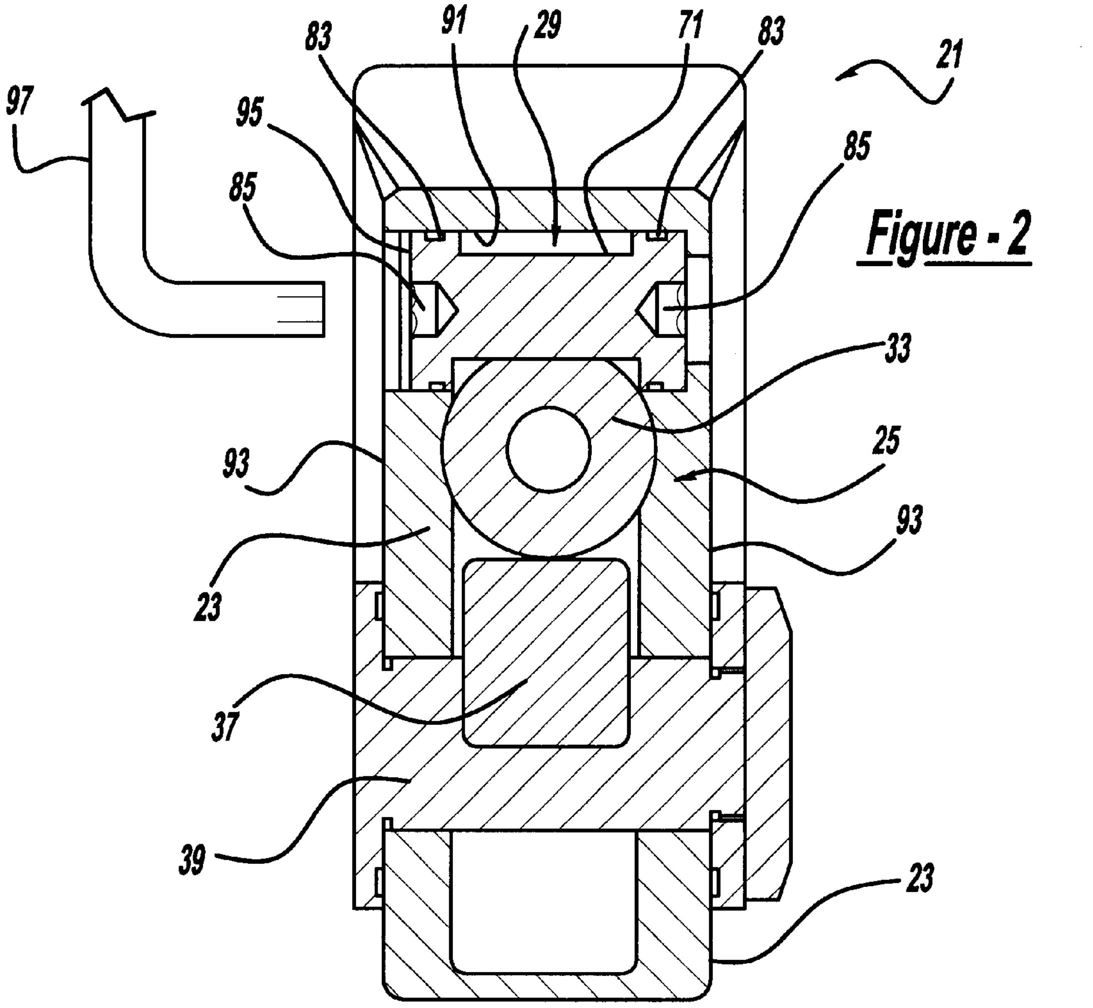
FIG. 2 is a cross-sectional view, taken along line 2—2 of FIG. 1, showing the first preferred embodiment clamp.
Figure 3:
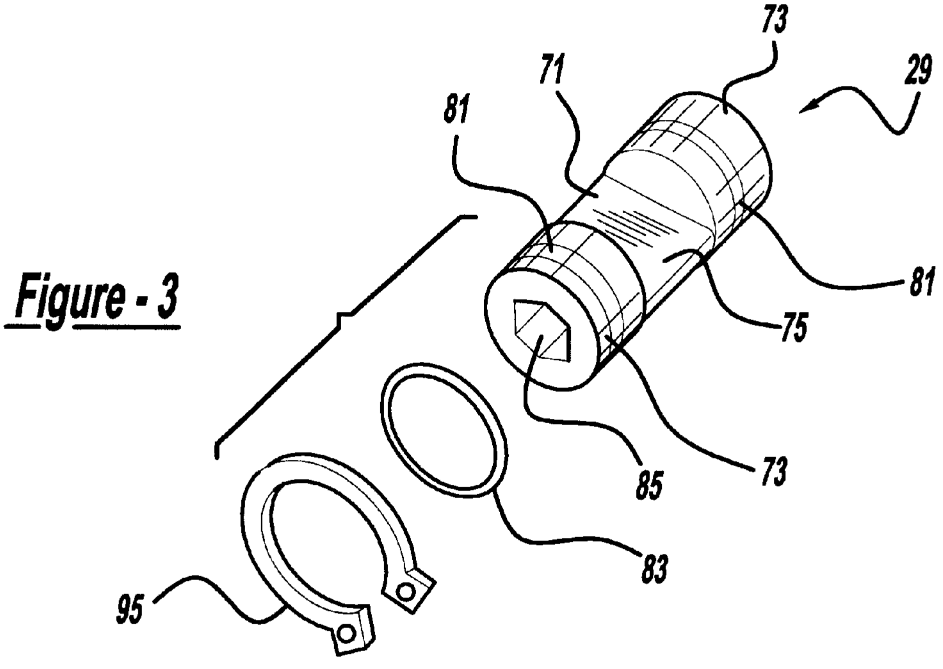
FIG. 3 is an exploded perspective view showing an unlock device employed in the first preferred embodiment clamp.

A first preferred embodiment of an automatically powered clamp 21 of the present invention is shown in FIGS. 1–4. Clamp 21 includes a single piece housing 23, a transmission or coupling mechanism 25, a piston 27 and an unlock device 29. Transmission mechanism 25 further includes a longitudinally elongated piston rod 31 secured to piston 27, a slide 33 mounted to an opposite end of piston rod 31, a straight link 35 having a first end pivotably coupled to slide 33, a crank 37 pivotably coupled to a second end of link 35 and a hub 39 secured to crank 37. Piston 27 is advanced and retracted in a linear manner by pneumatic-fluid pressure applied to the corresponding face of piston 27 within a piston cylinder 41. Concurrently, piston rod 39 and slide 33 are linearly advanced and retracted along a longitudinal axis 43 within a bore 45 of housing 23. A workpiece interfacing arm 51 is adjustably secured to hub 39 by way of multiple dowel pins 53, and a central nut and bolt assembly 55. Thus, linear advancing of piston 27, piston rod 31 and slide 33 along longitudinal axis 43 causes rotation of link 35, such that crank 37, hub 39 and arm 51 are rotated about a hub rotational axis 57, extending in a transverse and generally perpendicular direction to longitudinal centerline 43. Accordingly, arm 51 is operable to interface with and secure multiple sheet metal workpieces 59 against a stationary structure or fixed second arm (not shown). The piston, transmission mechanism and arm work substantially in accordance with the clamp disclosed in U.S. Pat. No. 5,884,903.

Unlock device 27 includes a driving formation 71 located between generally circular journalling segments 73. In the first preferred embodiment, driving formation 71 is a generally straight and narrow wall with opposite flat faces 75 bordered by a pair of curved edges 77. A groove 81 is disposed in each journalling segment 73 to receive an elastomeric O-ring 83. A hexagonal tool receptacle 85 is further depressed in each outboard end of unlock device 29.

An aperture 91 is transversely elongated through housing 23 above and slightly rearward of hub pivot axis 57, as illustrated. Unlock device 29 is rotatably located within aperture 91 and is inboard of the nominal faces 93 of housing 23. Hence, unlock device 29 does not project beyond or increase any external dimension of the clamp housing. O-rings 83 provide a reliable seal between journalling segment 73 of unlock device 29 and housing 23. Furthermore, a snap ring 95 is disposed on one side of unlock device 29 to retain unlock device within aperture 91 while still allowing it to rotate. An Allen wrench tool 97, or alternately a screw driver if tool receptacle 85 has a Phillips or flat head shape, can be removably inserted into either tool receptacle 85. Furthermore, a depressed abutment formation 101 is located within a transverse top side of slide 33. Abutment formation 101 has a lead-in surface with a relatively gentle angle of about 30 degrees from longitudinal centerline 43, but has a much steeper trailing abutment surface with an angle of about 70 degrees from the longitudinal centerline. Alternately, abutment formation can be located in a top or bottom side of the piston rod.

Figure 4:
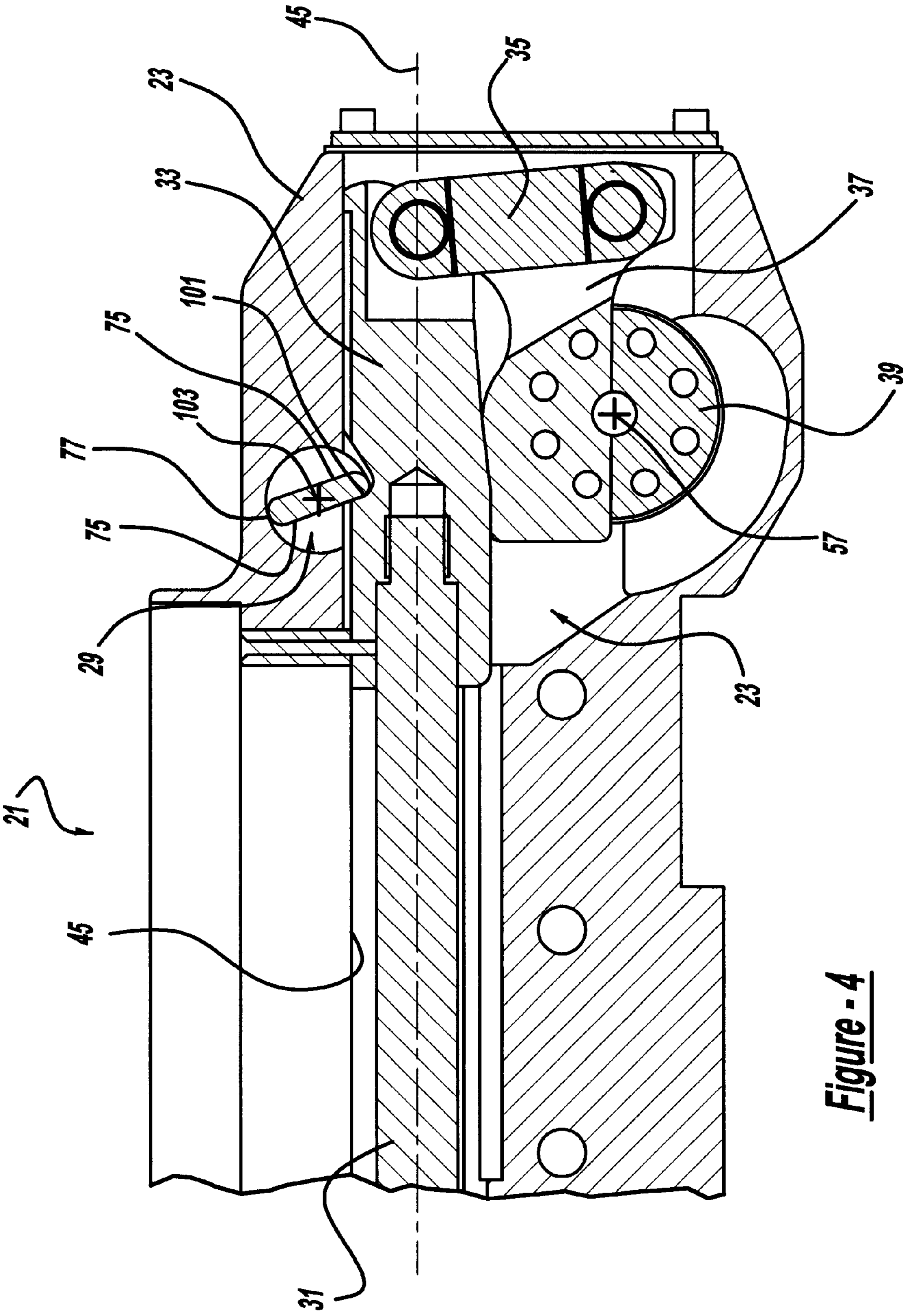
FIGS. 4–6 are a series of fragmentary, longitudinal-sectional views showing the first preferred embodiment clamp in various positions.
Figure 5:
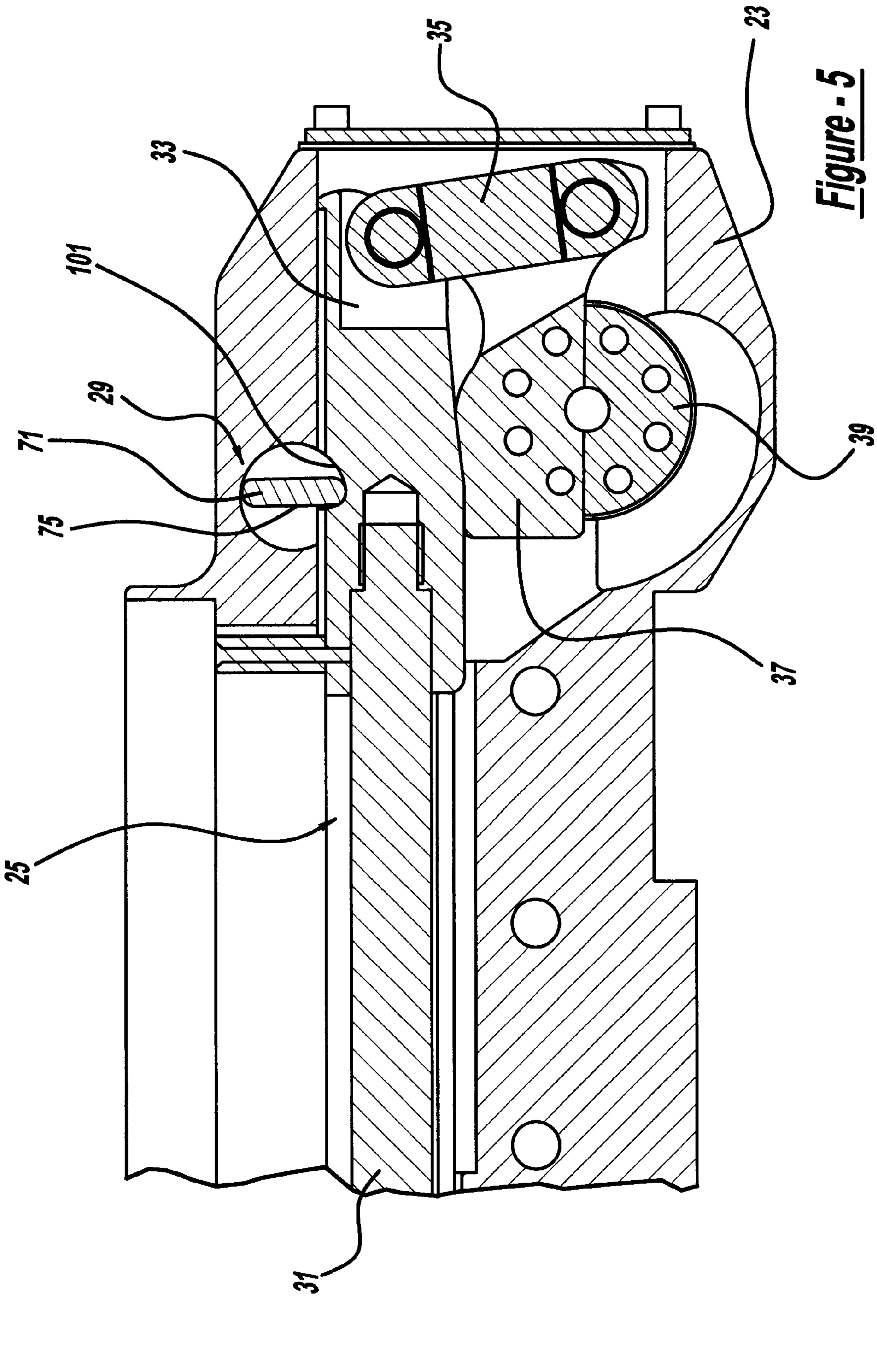
Figure 6:
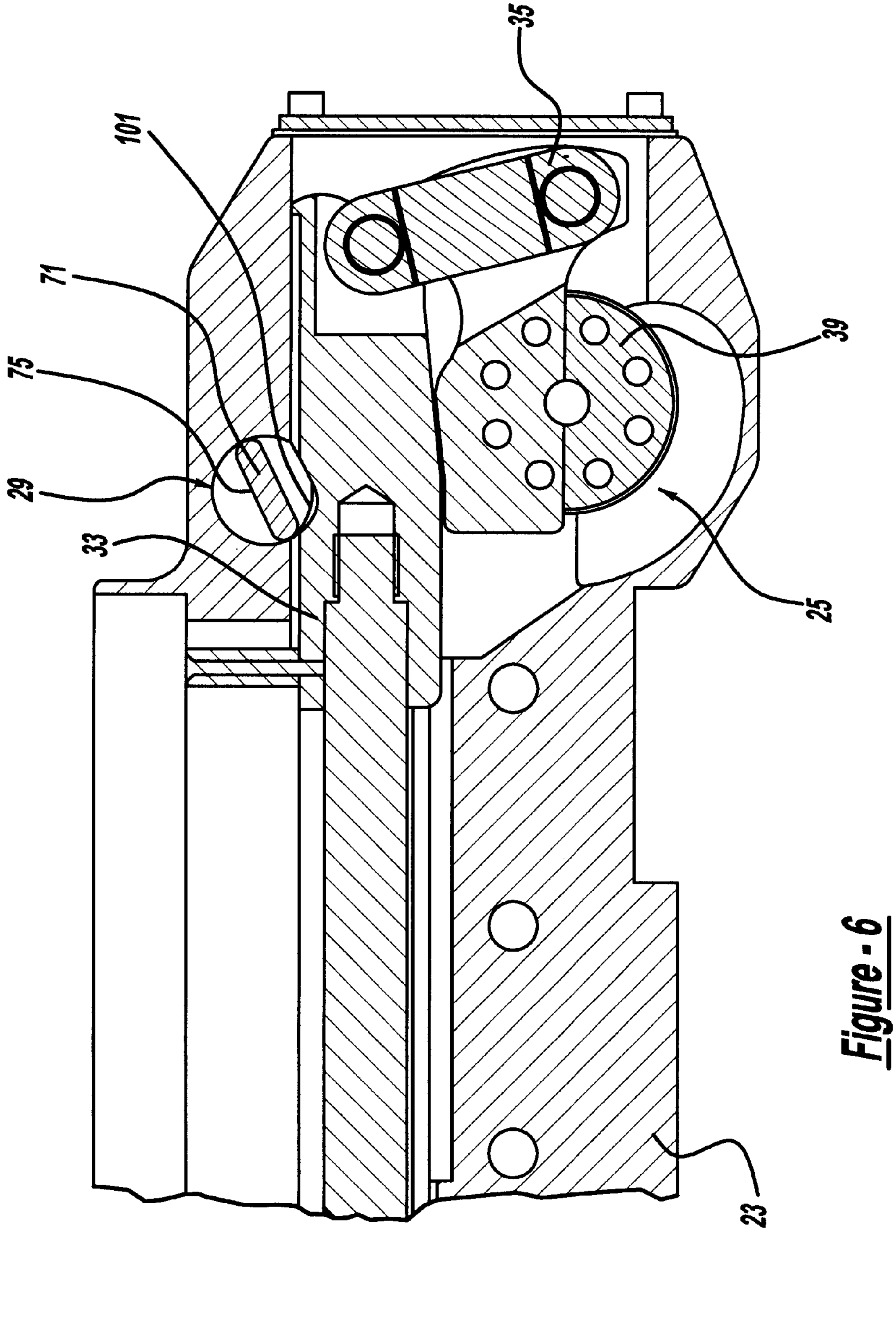

FIGS. 4–6 show the operational interface between unlock device 29 and transmission mechanism 25. In the event that transmission mechanism 25 is undesirably locked in a generally over-center position as shown in FIG. 4, the Allen wrench tool can be inserted in the externally accessible tool receptacle 85 (see FIG. 2) in order to rotate unlock device 29 about its transverse pivot axis 103. When unlock device 29 is manually rotated from the initial contact position of FIG. 4 to the rotated position of FIG. 5, driving formation 71 pushes against the trailing abutment surface of abutment formation 101, thereby manually retracting slide 33, piston rod 31 and the piston in a linear direction. Further continued rotation of unlock device 29 from the position shown in FIG. 5 to that in FIG. 6 further drivingly retracts transmission mechanism 25 and then allows clearance between driving formation 71 of locking device 29 and adjacent portions of transmission mechanism 25. Thereafter, the retracting pneumatic pressure can freely take over to completely retract the transmission mechanism and clamping arm, or alternately, the clamping arm itself can be manually rotated to obtain full retraction.

A second preferred embodiment clamp of the present invention is shown in FIGS. 7–9. In this embodiment, a rotatable unlock device 229 has a somewhat triangular shaped driving formation 271 defined by a pair of flat faces 275 having a relative angle of about 75 degrees and joined at an apex. A circular section 277 joins the opposite ends of faces 275. Flat faces 275 operably contact against and retractingly drive a component 225 associated with a transmission mechanism, such as a slide or piston rod, when unlock device 229 is manually rotated. Locking rings 295 transversely secure unlock device 229 within the corresponding transverse aperture through housing 223. O-rings (not shown) are also employed to ensure the complete sealing of the housing to internally retain grease while exclude airborne contaminants such as dirt, dust, weld splatter and the like.

A tool receptacle located on each end employs a pair of diagonally located wedge-shaped structures 301 and 303 which are spaced apart from each other to allow entry of a removable tool such as an Allen wrench 297 or screw driver shaft therebetween. Recessed sections 305 are spaced between structures 301 and 303 in order to allow unobstructed movement of tool 297 within a 90 degree range of lost motion before recontacting structures 301 and 303. In this exemplary embodiment, structures 301 and 303 outwardly project beyond the nominal face of the clamp housing in order to allow external accessibility of the tool. Alternately, a ramp angle can also be employed on structures 301 and 303 to ensure only retracted rotational engagement of the tool with the unlock device.

Figure 10:
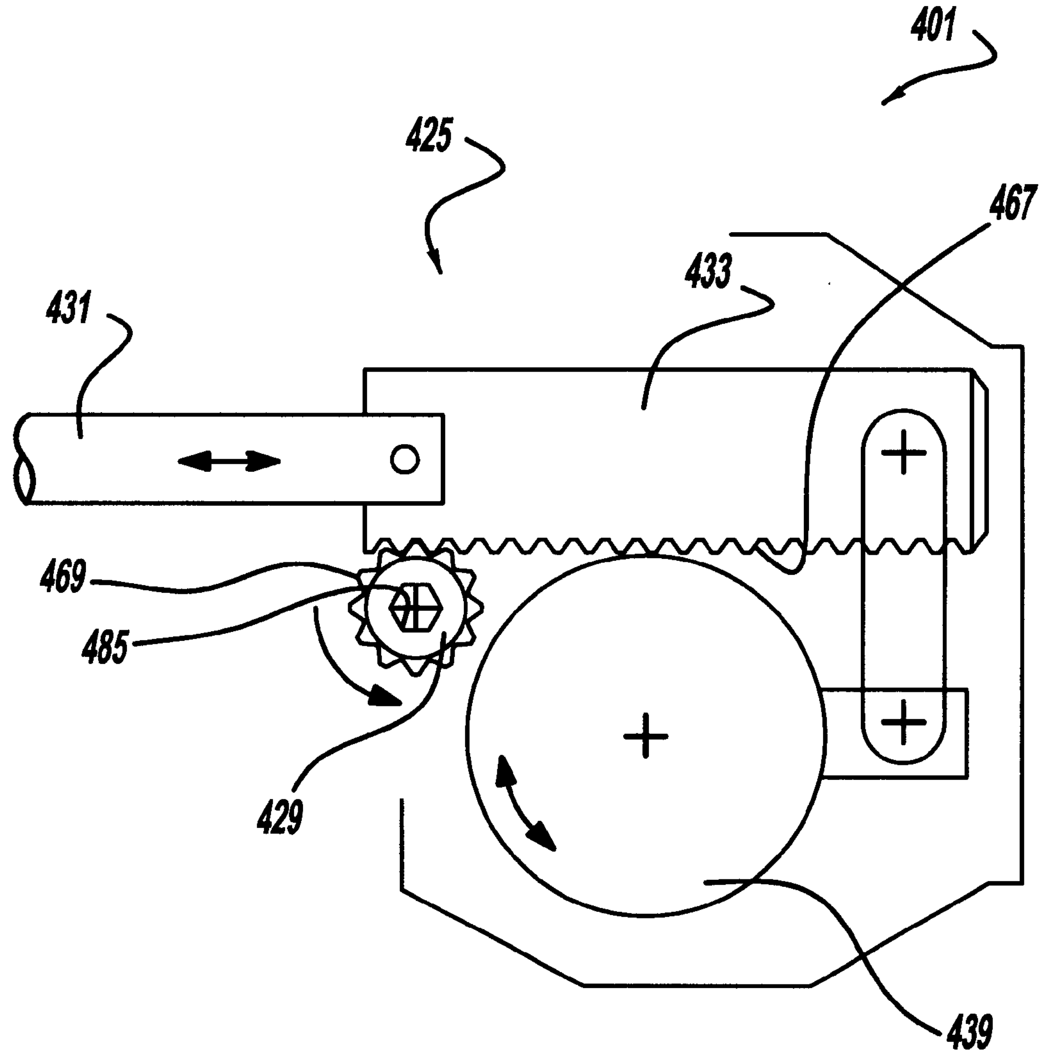
FIG. 10 is a diagrammatic side view showing a first alternate embodiment clamp of the present invention.

Referring now to FIG. 10, a first alternate embodiment of a clamp 401 of the present invention employs a rack and pinion interface between a transmission mechanism 425 and an unlock device 429. A linearly slidable slide 433 has a toothed rack 467 which is enmeshed with gear teeth 469 circumferentially projecting around a central driving formation of unlock device 429. Unlock device 429 is rotatable about a transverse centerline generally parallel to the rotational centerline of a hub 439 and generally perpendicular to a longitudinal axis of slide 433 and a piston rod 431. Insertion and manual rotation of an Allen wrench tool or the like within a tool receptacle 485 serves to rotate the gear-like unlock device 429. This allows for a manual override retraction or advancing movement of transmission mechanism 425. Notwithstanding, unlock device 429 is free spinning during normal pneumatic powered actuation of the piston, transmission mechanism 425 and the attached workpiece clamping arm.

Figure 11:
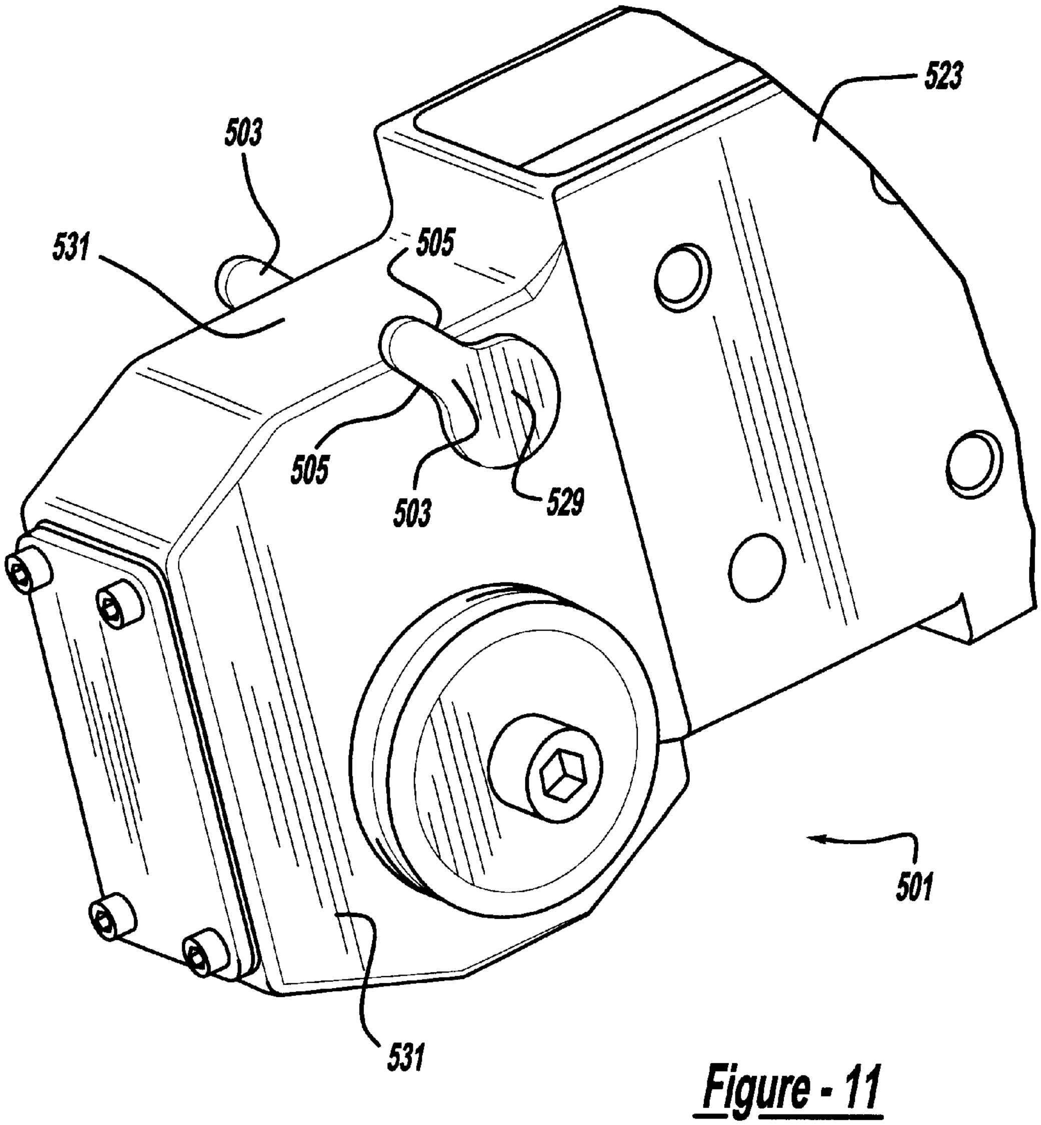
FIG. 11 is a fragmentary perspective view showing a second alternate embodiment clamp of the present invention.

A second alternate embodiment clamp 501 of the present invention is shown in FIG. 11. This clamp 501 includes a lever arm 503 projecting from each end of a rotatable unlock device 529. Unlock device 529 can be constructed like any of the previously disclosed embodiments. Lever arms 503, however, upwardly project above a nominal external face 531 of a housing 523. Thus, a tool, such as a hammer, can manually impact against a front or rear edge 505 of lever arm 503 to rotate unlock device 529 and move the transmission.

While various embodiments of the powered clamp have been disclosed, it should be appreciated that other variations may fall within the scope of the present invention. For example, an electromagnetic device, such as an electric motor, can be coupled to the unlock device to allow automatically powered rotation thereof. Furthermore, the presently disclosed clamp also includes grippers and other members having movable parts which can engage or interface with one or more workpieces. The features of the present invention are also applicable for hydraulically powered devices as well as the disclosed pneumatic ones. Other linkages and cams can further be added to or replace for the components disclosed with the present transmission mechanism. Moreover, the presently disclosed housing can also have a circular or various other external shapes. While various materials and angles have been disclosed, it should be appreciated that other materials and angles may be readily employed. It is intended by the following claims to cover these and any other departures from the disclosed embodiments which fall within the true spirit of this invention.

The invention claimed is:

1. A powered clamp comprising:

a housing having ends;

a fluid actuated piston;

a mechanism coupled to the piston and movable between retracted and advanced positions, the mechanism having a first member that is linearly movable and a second member that is rotatable when the piston advances and retracts, the mechanism being at least partially located in the housing; and an unlock device rotatable from a first orientation to a second orientation, the unlock device operably driving at least one of the mechanism and the piston from the advanced position toward the retracted position when the unlock device is rotated from the first orientation to the second orientation, the unlock device being entirely located between the ends of the housing.

2. The clamp of claim 1 wherein the second member is a hub having a rotational axis substantially perpendicular to an advancing and retracting direction of the piston.

3. The clamp of claim 2 further comprising a workpiece contacting arm removably attached to the hub.

4. The clamp of claim 3 wherein a rotational axis of the unlock device is substantially parallel to the rotational axis of the hub.

5. The clamp of claim 2 wherein the first member includes a piston rod and a slide block, the unlock device operably contacting against and pushing the first member when the unlock device is rotated.

6. The clamp of claim 1 wherein:

the first member includes an abutment formation;

the unlock device includes a driving formation; and manual rotation of the unlock device causes the driving formation to contact against and linearly move the abutment formation.

7. The clamp of claim 6 wherein the abutment formation is located on a transverse side of the first member.

8. The clamp of claim 7 wherein the abutment formation is a depression.

9. The clamp of claim 1 wherein the unlock device includes a driving formation and substantially circular journalling segments, the driving formation having at least one flat surface which is located between the journalling segments.

10. The clamp of claim 9 further comprising a sealed housing, removable retainers securing the journalling segments to the housing and seals sealing the journalling segments to the housing.

11. The clamp of claim 1 wherein the unlock device does not extend beyond a nominal external face of the housing.

12. The clamp of claim 1 wherein the mechanism includes a link pivotally coupling the first member to the second member, and the unlock device operably retracts the first and second members away from an overcenter condition if fluid power is not present.

13. The clamp of claim 1 wherein the unlock device includes a tool receptacle which accepts manual insertion and rotation of a tool to drive the unlock device.

14. A workpiece securing apparatus comprising:

an elongated housing having opposite external ends and external side faces;

a fluid powered piston movable in a first direction;

a workpiece interfacing arm movable from an open position to a closed position;

a transmission operably coupling the piston to the arm, at least a majority of the transmission being located inside the housing;

an unlocking member manually movable from a first orientation to a second orientation, the unlocking member operably contacting against and moving the transmission during movement between the orientations, the unlocking member being externally accessible through at least one of the side faces of the housing.

15. The apparatus of claim 14 wherein the unlocking member is rotatable between the orientations.

16. The apparatus of claim 15 wherein the unlocking member has a rotational axis substantially perpendicular to the first direction of the piston.

17. The apparatus of claim 14 wherein:

the transmission includes an abutment formation;

the unlocking member includes a flat driving formation; and rotation of the unlocking member causes the driving formation to contact against and nearly move the abutment formation.

18. The apparatus of claim 17 wherein the abutment formation is located on a transverse side of the transmission substantially perpendicular to the first direction of the piston.

19. The apparatus of claim 17 wherein the abutment formation is a depression.

20. The apparatus of claim 14 wherein a rotational axis of the unlocking member is substantially parallel to a rotational axis of the arm.

21. The apparatus of claim 14 wherein the transmission includes a piston rod, a linearly moving slide block, at least one link and a rotatable hub, the arm being removably mounted to the hub.

22. The apparatus of claim 14 wherein the piston is movable inside of the housing, and the fluid is air.

23. The apparatus of claim 14 wherein the unlocking member includes a driving formation and substantially circular journalling segments, the driving formation having at least one flat surface which is located between the journalling segments.

24. The apparatus of claim 14 further comprising at least one removable retainer securing the unlocking member to the housing and at least one seal sealing the unlocking member to the housing, the housing being sealed to deter entry of external contaminants.

25. The apparatus of claim 14 wherein the unlocking device includes a tool receptacle which accepts manual insertion of at tool to move the unlocking member.

26. A workpiece securing apparatus comprising:

a fluid powered piston;

a workpiece engaging arm movable from a first position to a second position;

a driving assembly coupling the arm to the piston, at least one member of the driving assembly movable in a longitudinal linear direction; and an externally accessible and rotatable device operably rotating from a first angular orientation to a second angular orientation, a rotational axis of the rotatable device being substantially perpendicular to the longitudinal linear direction, the rotatable device operably moving the driving assembly when the rotatable device is moved between the orientations.

27. The apparatus of claim 26 wherein:

the driving assembly includes an abutment formation;

the rotatable device includes a flat driving formation; and rotation of the rotatable device causes the driving formation to contact against and linearly move the abutment formation.

28. The apparatus of claim 27 wherein the abutment formation is a depression.

29. The apparatus of claim 26 further comprising a housing, the driving assembly being located inside the housing.

30. The apparatus of claim 29 wherein the rotatable device is manually rotatable and openly accessible from outside of the housing.

31. The apparatus of claim 26 wherein the rotational axis of the rotatable device is substantially parallel to a rotational axis of the arm.

32. The apparatus of claim 26 wherein the driving assembly includes a piston rod, a linearly moving slide block, at least one link and a rotatable hub, the arm being removably mounted to the hub.

33. The apparatus of claim 26 wherein the rotatable device includes a driving formation and substantially circular journalling segments, the driving formation having at least one flat surface which is located between the journalling segments.

34. The apparatus of claim 26 wherein the rotatable device includes a tool receptacle which accepts manual insertion of a tool to manually move the rotatable device between the orientations.

35. The apparatus of claim 26 wherein the rotatable device operably retracts the driving assembly away from an overcenter condition if fluid power is not present.

36. The apparatus of claim 26 further comprising a housing, the entire rotatable member always being locating within a periphery of the housing when assembled.

37. A workpiece clamping apparatus comprising:

an actuator;

a workpiece engaging arm movable from a first position to a second position;

a driving assembly coupling the arm to the actuator, at least one member of the driving assembly linearly movable in a longitudinal direction; and an externally accessible and rotatable unlocking device operably rotating from a first angular orientation to a second angular orientation, a rotational axis of the rotatable unlocking device being substantially perpendicular to the longitudinal direction, the rotatable unlocking device operably contacting against and moving the driving assembly toward a retracted position when the rotatable unlocking device is moved between the orientations.

38. The apparatus of claim 37 wherein the actuator includes a fluid driven piston.

39. The apparatus of claim 37 further comprising a mechanical tool removeably engaging with an external interfacing feature of the rotatable unlocking device, the tool allowing manual rotation of the rotatable unlocking device.

* * * * *

UNITED STATES PATENT AND TRADEMARK OFFICE
CERTIFICATE OF CORRECTION

PATENT NO. : 6,557,840 B2 
DATED : May 6, 2003
INVENTOR(S) : Edwin G. Sawdon

It is certified that error appears in the above-identified patent and that said Letters Patent is hereby corrected as shown below:

<u>Column 1,</u>
Line 43, after "arm" insert -- , --.

<u>Column 6,</u>
Line 22, "at" should be -- a --.

<u>Column 7,</u>
Line 5, "locating" should be -- located --.

Signed and Sealed this

Twenty-second Day of July, 2003

JAMES E. ROGAN
*Director of the United States Patent and Trademark Office*